(12) United States Patent
Sigworth

(10) Patent No.: US 7,781,500 B2
(45) Date of Patent: Aug. 24, 2010

(54) COUPLING AGENTS FOR NATURAL FIBER-FILLED POLYOLEFINS

(75) Inventor: William D. Sigworth, Naugatuck, CT (US)

(73) Assignee: Crompton Corporation, Middlebury, CT (US)

( * ) Notice: Subject to any disclaimer, the term of this patent is extended or adjusted under 35 U.S.C. 154(b) by 300 days.

(21) Appl. No.: 10/823,953

(22) Filed: Apr. 13, 2004

(65) Prior Publication Data

US 2004/0214925 A1 Oct. 28, 2004

Related U.S. Application Data

(63) Continuation-in-part of application No. 10/412,981, filed on Apr. 14, 2003, now abandoned.

(51) Int. Cl.
*B29C 47/00* (2006.01)
(52) U.S. Cl. .................................................. 524/13
(58) Field of Classification Search .............. 524/9, 524/13, 15, 35, 504; 525/70, 74, 285
See application file for complete search history.

(56) References Cited

U.S. PATENT DOCUMENTS

| | | | |
|---|---|---|---|
| 4,717,742 A | 1/1988 | Beshay | 523/203 |
| 4,820,749 A | 4/1989 | Beshay | 523/203 |
| 4,868,226 A * | 9/1989 | Mitsuno et al. | 523/212 |
| 5,075,359 A * | 12/1991 | Castagna et al. | 524/13 |
| 6,265,037 B1 | 7/2001 | Godavarti et al. | 428/34 |
| 6,300,415 B1 | 10/2001 | Okayama et al. | 525/191 |
| 6,682,789 B2 * | 1/2004 | Godavarti et al. | 428/34 |
| 6,716,928 B2 * | 4/2004 | Botros | 525/285 |
| 2002/0161072 A1 * | 10/2002 | Jacoby et al. | 524/27 |
| 2003/0065059 A1 * | 4/2003 | Krishnaswamy | 524/1 |

OTHER PUBLICATIONS

"Epolene Maleated Polyolefins" (publication APG-1A, Mar. 2003, Eastman Chemical Company).*
"Epolene Polymers" (publication WA-5E, Nov. 2002, Eastman Chemical Company).*
"Epolene Waxes" (publication F-301E, Dec. 1996, Eastman Chemical Company).*
Jacoby et al., Wood Filled High Crystallinity Polypropylene, Wood-Plastic Conference sponsored by Plastics technology, Baltimore, MD, Dec. 5-6, 2000, pp. 115-137.
Wolcott et al., Coupling Agent/Lubricant Interactions in Commercial Wood Plastic Formulations, Sixth International Conference on Woodfiber-Plastic Composites, Madison, WI, May 15-16, 2001, pp. 197-204.
Sigworth et al., The Use of Functionalized Polyolefins in Environmentally Friendly Plastic Composites, GPEC 2002, Feb. 13-14, 2002, pp. 1-11.
Wefer et al., The Use of Functionalized Coupling Agents in Wood-Filled Polyolefins, Wood-Plastic Composites: A Sustainable Future, Vienna, Austria, May 15, 2002, pp. 1-17.
Heath, The Use of Additives to Enhance Properties and Processing of Wood Polymer Composites, Progress in Woodfibre-Plastics Composites Conference 2002, May 23-24, 2002, Toronto, Canada, pp. 1-8.
Sigworth, Additives for Wood-filled Polyolefins Coupling Agents, Progress in Woodfibre-Plastic Composites Conference, May 24, 2002, Toronto, Ontario, Canada, pp. 1-17.
Kokta et al., Use of Wood Flour as Filler in Polypropylene: Studies on Mechanical Properties, Polym.-Plast. Technol. Eng., 28(3), (1989), pp. 247-259.
Raj et al., The Influence of Coupling Agents on Mechanical Properties of Composites Containing Cellutosic Fillers, Polym.-Plast. Technol. Eng., 29(4), (1990), pp. 339-353.
Matuana et al., Influence of Interfacial Interactions on the Properties of PVC/Cellulosic Fiber Composites, ANTEC, vol. 3, (1998), pp. 3313-3318.

* cited by examiner

*Primary Examiner*—Edward J Cain
(74) *Attorney, Agent, or Firm*—Joseph Suhadolnik

(57) ABSTRACT

Disclosed herein is a process for preparing a composite material comprising mixing at least one natural fiber, at least one polyolefin resin, and at least one functionalized polyolefin coupling agent to provide said composite material; wherein said functionalized polyolefin coupling agent possesses a molecular weight distribution of greater than 2.5 ($M_w/M_n$ by GPC) and comprises a base polyolefin resin that is grafted with a total of more than about 1 mmole of at least one polar monomer per 100 grams of functionalized polyolefin coupling agent.

13 Claims, No Drawings

COUPLING AGENTS FOR NATURAL FIBER-FILLED POLYOLEFINS

CROSS-REFERENCE TO RELATED APPLICATION

This application is a continuation-in-part of U.S. application Ser. No. 10/412,981, filed Apr. 14, 2003 now abandoned.

BACKGROUND OF THE INVENTION

1. Field of the Invention

The present invention relates to polyolefin composites comprising natural fibers. More particularly, the present invention relates to natural fiber-filled polyolefin composites having increased strength resulting from the inclusion of a functionalized polyolefin coupling agent having a broad molecular weight distribution and containing more than about 1 mmole of functionalized monomer per 100 grams of polymer.

2. Description of Related Art

It is known in the art to prepare composites comprising thermoplastic resinous matrix materials having dispersed therein organic reinforcing fillers, such as cellulosic or lignocellulosic fibers. It is also known in the art to improve the mechanical properties of such composites by treating such fibers with coupling agents prior to their introduction into the thermoplastic resinous matrix material. The following articles are among many that make reference to known technology:

P. Jacoby, et. al., "Wood Filled High Crystallinity Polypropylene," Wood-Plastic Conference sponsored by Plastics Technology, Baltimore, Md., Dec. 5-6, 2000;

M. Wolcott et al., "Coupling Agent/Lubricant Interactions in Commercial Wood Plastic Formulations," 6th International Conference on Woodfiber-Plastic Composites, Madison, Wis., May 15-16, 2001;

M. Chowdhury et al., "Effect of Maleated Polyolefin Copolymer and Lubricant in Wood-Polyolefin Composites," 6th International Conference on Woodfiber-Plastic Composites, Madison, Wis., May 15-16, 2001;

W. Sigworth, "The Use of Functionalized Polyolefins in Environmentally Friendly Plastic Composites," GPEC 2002, Feb. 13-14, 2002, Detroit, Mich.;

J. Wefer and W. Sigworth, "The Use of Functionalized Coupling Agents in Wood-filled Polyolefins," Wood-Plastic Composites, A Sustainable Future Conference, May 14-16, 2002, Vienna, Austria;

R. Heath, "The Use of Additives to Enhance the Properties and Processing of Wood Polymer Composites," Progress in Woodfibre-Plastic Composites Conference 2002, May 23-24, 2002, Toronto, Canada; and W. Sigworth, "Additives for Wood Fiber Polyolefins: Coupling Agents, Progress in Woodfibre-Plastic Composites Conference 2002, May 23-24, 2002, Toronto, Canada.

Additionally, Kokta, B. V. et al., *Polym.-Plast. Technol. Eng.*, 28(3):247-259 (1989) studied the mechanical properties of polypropylene with wood flour. The wood flour was pretreated with polymethylene polyphenylisocyanate and silane coupling agents before adding it to the polymer.

Raj, R. G. et al., *Polym.-Plast. Technol. Eng.*, 29(4):339-353 (1990) filled high density polyethylene with three different cellulosic fibers that had been pretreated with a silane coupling agent/polyisocyanate to improve the adhesion between the fibers and the polymer matrix.

Matuana, L. M. et al. *ANTEC* 3:3313-3318 (1998) studied the effect of the surface acid-base properties of plasticized PVC and cellulosic fibers on the mechanical properties of the plastic/cellulosic composite. They modified the surface of the fibers with γ-aminopropyltriethoxysilane, dichlorodiethylsilane, phthalic anhydride, and maleated polypropylene.

U.S. Pat. No. 4,717,742 discloses resin composites reinforced with silanes grafted onto organic fillers that are said to have improved durability, even at sub-zero degrees or at high temperatures, improved physical properties and can be prepared by a process, in which the organic filler is grafted with a silane coupling agent in maleated polymer matrix.

U.S. Pat. No. 4,820,749 discloses a composite material based on a polymeric or copolymeric substance which may be a thermoplastic or thermosetting material or rubber, and an organic material which is cellulosic or starch. The cellulosic material is grafted with a silylating agent. Processes for preparing this composite are also disclosed.

U.S. Pat. No. 6,265,037 discloses an improved composite structural member comprising a complex profile structural member, made of a composite comprising a polypropylene polymer and a wood fiber. The material is said to be useful in conventional construction applications.

U.S. Pat. No. 6,300,415 discloses a polypropylene composition for the production of various molded articles which are said to be excellent in moldability, mold shrinkage factor on molding, rigidity, flexibility, impact resistance, in particular low-temperature impact resistance, transparency, gloss, stress-whitening resistance, and the balance thereof; various molded articles having the above properties; a propylene composition which is suitable for a base resin for the polypropylene composition; and a process for the production thereof. The propylene composition comprises a propylene homopolymer and a propylene-ethylene copolymer.

The disclosures of the foregoing are incorporated herein by reference in their entirety.

SUMMARY OF THE INVENTION

It has now been discovered that functionalized polyolefins that are characterized by having a broad molecular weight distribution are more effective in improving the mechanical strength properties, creep resistance, and water absorption resistance of natural fiber-filled polyolefin composites than are more conventional functionalized polyolefins that have narrower molecular weight distributions.

More particularly, the present invention is directed to a process for preparing a composite material comprising mixing together at least one natural fiber, at least one polyolefin resin, and at least one functionalized polyolefin coupling agent to provide said composite material; wherein said functionalized polyolefin coupling agent possesses a molecular weight distribution of greater than 2.5 ($M_w/M_n$ by GPC) and comprises a base polyolefin resin that is grafted with a total of more than about 1 mmole of at least one polar monomer per 100 grams of functionalized polyolefin coupling agent.

In another aspect, the present invention is directed to a composite material prepared by a process comprising mixing together at least one natural fiber, at least one polyolefin resin, and at least one functionalized polyolefin coupling agent to provide said composite material; wherein said functionalized polyolefin coupling agent possesses a molecular weight distribution of greater than 2.5 ($M_w/M_n$ by GPC) and comprises a base polyolefin resin that is grafted with a total of more than about 1 mmole of at least one polar monomer per 100 grams of functionalized polyolefin coupling agent.

In still another aspect, the present invention is directed to a composite material comprising at least one natural fiber, at least one polyolefin resin, at least one functionalized polyolefin coupling agent, and at least one lubricant selected from the group consisting of fatty acid amides and fatty acid esters; wherein said functionalized polyolefin coupling agent possesses a molecular weight distribution of greater than 2.5 ($M_w/M_n$ by GPC) and comprises a base polyolefin resin that is grafted with a total of more than about 1 mmole of at least one polar monomer per 100 grams of functionalized polyolefin coupling agent.

DESCRIPTION OF THE PREFERRED EMBODIMENTS

It is often desirable to increase the strength properties of natural fiber-filled polyolefin composites, e.g., wood-polyolefin composites, for construction and automotive applications. It is known to use maleated polyolefins to improve dispersion of the natural fiber in the polyolefin and to increase interfacial adhesion between the fiber and resin. These improvements lead to increased strength properties. The maleated polyolefins used heretofore have narrow molecular weight distributions ($M_w/M_n$ by GPC<2.5).

It has been discovered that substantial improvements in strength properties can be obtained by using a functionalized polyolefin that possesses a molecular weight distribution of greater than 2.5 ($M_w/M_n$ by GPC) and comprises a base polyolefin resin that is grafted with a total of more than about 1 mmole, preferably more than about 5 mmoles, more preferably more than about 10 mmoles, of at least one polar monomer per 100 grams of base polyolefin resin.

The present invention permits the use of wood/polyolefin composites in marine decking, deck supports, railing systems, automotive parts, and similar applications where additional structural strength is needed. The invention also provides composites with improved long-term durability by reducing water absorption and increasing creep resistance.

As employed herein, the term "natural fiber" means a fiber obtained, directly or indirectly, from a source in nature. Included within the term, but not limited thereto, are wood flour, wood fiber, and agricultural fibers such as wheat straw, flax, hemp, kenaf, nut shells, and rice hulls. Preferably, the natural fiber is selected from the group consisting of starch or cellulosic material such as cotton fibers, wood pulps, stem or vegetable fibers, wood flours, starch, waste papers, cartons, or cellulosic cloth. More preferably, the natural fiber is wood flour, wood fiber, hemp, flax, or kenaf. Wood fiber, in terms of abundance and suitability, can be derived from either soft woods or evergreens or from hard woods commonly known as broadleaf deciduous trees. While soft wood and hard wood are preferably the primary sources of fiber for the invention, additional fiber make-up can be derived from a number of secondary or fiber reclaim sources, including hard woods, bamboo, rice, sugar cane, and recycled fibers from newspapers, boxes, computer printouts, and the like. However, the primary source for wood fiber used in the process of this invention comprises the wood fiber by-product of sawing or milling softwoods and hardwoods commonly known as sawdust or milling tailings. Fiber levels in the range of from about 20 to about 85 weight % based on the total formulation weight of the composite can be used. Fiber levels in the range of from about 30 to about 80 weight % are preferred. Fiber levels in the range of from about 40 to about 70 weight % are most preferred.

The polyolefins employed in the practice of the present invention are typically polymerized from ethylene, propylene, and/or other alpha olefins. Where ethylene is used, it can be, for example, high density polyethylene (HDPE), low density polyethylene (LDPE), or linear low density polyethylene (LLDPE). Polypropylene homopolymer, as well as copolymers and terpolymers containing ethylene, propylene, and/or other alpha olefins, and/or non-conjugated dienes can also be advantageously employed, as can blends of these polymers.

Thus, the polyolefin materials of the invention can, if desired, comprise either a polypropylene copolymer wherein the polymer comprises a major proportion of propylene combined with a minor proportion (typically less than 50 wt %, more commonly between about 0.1 and 10 wt %) of a second monomer that can comprise ethylene or a $C_4$-$C_{16}$ monomer material. Such copolymers often have improved processability, flexibility, and compatibility.

Preferred ethylene copolymers can comprise a major proportion of ethylene and a minor proportion (typically less than 50 wt %, preferably about 0.1 to about 10 wt %) of a $C_3$-$C_{18}$ monomer.

Polypropylene homopolymer and HDPE, i.e., high density polyethylene, are most preferred for use in the practice of the present invention.

The functionalized polyolefin, which preferably comprises polyethylene or polypropylene as the base polyolefin resin, is one that contains reactive groups that can react with the functional groups on the surface of the natural fiber. The reactive groups are provided by grafting at least one polar monomer onto the base polyolefin resin. Suitable polar monomers include ethylenically unsaturated carboxylic acids or ethylenically unsaturated carboxylic acid anhydrides. Mixtures of the acids and anhydrides, as well as their derivatives, can also be used. Examples of the acids include maleic acid, fumaric acid, itaconic acid, crotonic acid, acrylic acid, methacrylic acid, maleic anhydride, itaconic anhydride, and substituted maleic anhydrides. Maleic anhydride is preferred. Derivatives that may also be used include salts, amides, imides, and esters. Examples of these include, glycidyl methacrylate, mono- and disodium maleate, and acrylamide. Virtually any olefinically reactive residue that can provide a reactive functional group on a modified polyolefin polymer can be useful in the invention.

In accordance with the present invention, the coupling agents comprise a functionalized polyolefin, such as a functionalized polyethylene or polypropylene, that has a molecular weight distribution as measured by the ratio of weight average molecular weight to number average molecular weight ($M_w/M_n$) by gel permeation chromatography (GPC) of greater than 2.5. Preferably, the molecular weight distribution should be greater than 3.0, more preferably 3.5. Generally, such functionalized polyolefins will have a weight average molecular weight (by GPC) that ranges from about 5,000 to about 200,000.

The functionalized polyolefin coupling agent is modified with from about 1 to as much as about 100 mmoles of polar monomer per 100 grams of the functionalized polyolefin coupling agent. Preferred coupling agents comprise either a modified polypropylene or a modified polyethylene modified with maleic anhydride residues. The most preferred coupling agents are maleic anhydride modified polypropylenes and maleic anhydride modified high density polyethylenes. Thus, the preferred materials contain more than about 1, preferably more than about 5, more preferably more than about 10, mmoles of maleic anhydride per 100 grams of functionalized polyolefin.

It is known to prepare functionalized polyolefin coupling agents by a melt-state process called reactive extrusion. This mechanism is well established and has been described by DeRoover et al., in the Journal of Polymer Science, Part A: Polymer Chemistry, vol. 33, pp 829-842 (1995). Polymer, functionalized monomer, and a free radical initiator are added to a twin screw extruder and subjected to elevated temperatures. During this process, a hydrogen atom is abstracted from the polymer chain by the initiator. The polymer undergoes chain scission leaving the free radical at the end of the shortened chain. The functional monomer then reacts at the site of the free radical resulting in the formation of a functional site at the end of the polymer chain. Since higher molecular weight polymer chains are statistically more likely to react with the free radicals, narrowing of the molecular weight distribution of the polymer is characteristic of reactive extrusion processes.

Although in no way intended to limit the scope of the present invention, functional polyolefin coupling agents of the present invention can be prepared by solution or solid-state processes. Such processes are well known to those skilled in the art, and are described, for example, in U.S. Pat. Nos. 3,414,551 and 5,079,302, G. Ruggeri, et. al., European Polymer Journal, 19, 863 (1983) and Y. Minoura, et. al., Journal of Applied Polymer Science, 13, 1625 (1969), the contents of each of which are incorporated by reference herein. These processes favor a reaction of the functional monomer with the free radical site on the polymer before the polymer can undergo chain scission. The end result is then to have functional monomer along the polymer chain instead of just at the ends. In addition, the narrowing of the molecular weight distribution of the polymer noted in reactive extrusion processes does not take place during solution or solid-state functionalization processes.

Functionalized polyolefin levels of about 0.5 to about 10% based on the total formulation weight of the composite can be used with levels of about 1-5% being preferred.

Depending on their end use requirement, the composites of the present invention can also contain further additives and stabilizers, for example, potassium, sodium, calcium, magnesium, and barium soaps or other tin derivatives, as well as, inter alia, plasticisers, epoxide compounds, metal perchlorates, lubricants, fillers, non-natural fiber reinforcing agents, antioxidants, polyols, dawsonites, hydrotalcites, organic phosphites, 1,3-diketo compounds, mono-, oligo- or polymeric dihydropyridines, sterically hindered amines (HALS), light stabilisers, UV absorbers, fatty acid esters, paraffins, blowing agents, fluorescent whitening agents, pigments, flame retardants, antistatic agents, aminocrotonates, thiophosphates, gelling assistants, metal deactivators, peroxide scavenging compounds, modifiers and further sequestrants for Lewis acids, and the like, all as described in detail in U.S. Pat. No. 6,531,533, the disclosure of which is incorporated herein by reference in its entirety.

The products of this invention can be processed using conventional techniques, including, but not limited to, the following:
1. Adding the products of the invention to the main hopper of an extruder along with resin and other additives followed by addition of the natural fiber downstream via a side feeder;
2. Adding the natural fiber through the main feeder and allowing it to be dried prior to adding the resin, coupling agent, and other additives downstream via a side feeder;
3. Mixing all ingredients together in a heated internal batch mixer, such as the types commonly referred to as Banbury or Brabender mixers; and
4. Proprietary extrusion and batch processing procedures which have been found to be suitable for compounding natural fiber/thermoplastic composites.

The advantages and the important features of the present invention will be more apparent from the following examples.

EXAMPLES

Functionalized polyolefin coupling agents both within and outside the scope of the invention were synthesized. Characterization data for these coupling agents are set forth in Tables 1-A and 1-B below.

The maleic anhydride content of the coupling agents was determined by dissolving them in boiling xylene and titrating to a Thymol Blue end point using a standardized 0.3N methanolic KOH solution. The KOH titrant was standardized using benzoic acid. The number of milliequivalents of KOH titrant needed to neutralize one hundred grams of coupling agent was determined. The percent maleic anhydride in the coupling agent was then calculated assuming one mole of KOH neutralized one mole of maleic anhydride. This assumption was confirmed by titration of straight maleic anhydride under the same conditions that the coupling agents were tested. The number of millimoles of functionality per 100 gms of coupling agent was calculated by dividing the percent maleic anhydride by the molecular weight of this chemical (98) and multiplying by 1000.

The Melt Flow Ratings of the coupling agents were determined using a Tinius Olsen Extrusion Plastometer Model MP600 following the procedures outlined in ASTM D1238.

Molecular weight analysis was conducted by gel permeation chromatograph using a Waters GPC 150C with Styragel HT 5, 4, 3, 6A columns and refractive index detector. Test temperature was 140° C. and o-dichlorobenzene was used as the solvent. Calibration was done using two standards: PP 105 and PP 150 from American Polymer Standards.

The coupling agents were evaluated in wood-filled polypropylene formulations. All of the ingredients were blended together and fed into the main hopper of a 30 mm Coperion twin screw extruder. A strand of the compounded product was cooled in a water bath and pelletized. The pellets were dried overnight at 100° C. and injection molded to make the specimens for mechanical property testing.

The following ASTM test procedures were used to generate the mechanical properties: D638 (tensile strength), D790 (flexural strength), Izod impact (D256), and Charpy (D6110). In the impact testing, the notched Izod bar was placed in the impact tester so that the notch was on the face of the sample which was opposite the side impacted by the swinging pendulum of the tester. In the Charpy test, the bar was not notched. Water absorption was determined by immersing two halves of a tensile bar in tap water for thirty days at room temperature and measuring the weight gain.

TABLE 1-A

Characterization of Maleic Anhydride Functionalized Polyolefins

| | Example | | | | |
|---|---|---|---|---|---|
| | 1 (Comparative) | 2 (Comparative) | 3 | 4 | 5 |
| Titration - meq KOH/100 gm polymer | 9.59 | 16.32 | 32.63 | 30.17 | 32.04 |
| % Maleic Anhydride | 1.0 | 1.6 | 3.2 | 3.0 | 3.2 |
| Mmoles of MA/100 gm Coupling Agent | 10.2 | 16.3 | 32.7 | 30.6 | 32.7 |
| MFR (230° C., 2.16 kg) | 250 | 1000 | 2.9 | 2.7 | 9.3 |
| $M_w$ by GPC | 86,200 | 59,600 | 294,800 | 53,900 | 65,900 |
| $M_n$ by GPC | 35,900 | 24,400 | 46,250 | 19,600 | 17,600 |
| $M_w/M_n$ by GPC | 2.40 | 2.44 | 6.4 | 2.75 | 3.74 |

TABLE 1-B

Characterization of Maleic Anhydride Functionalized Polyolefins

| | Example | | |
|---|---|---|---|
| | 6 | 7 | 8 |
| Titration - meq KOH/100 gm polymer | 24.06 | 23.68 | 16.41 |
| % Maleic Anhydride | 2.4 | 2.4 | 1.6 |
| Mmoles of MA/100 gm Coupling Agent | 24.5 | 24.5 | 16.3 |
| MFR (230° C., 2.16 kg) | 157 | 320 @ 190° C. | 720 |
| $M_w$ by GPC | 109,400 | 78,800 | 72,600 |
| $M_n$ by GPC | 21,200 | 20,800 | 23,100 |
| $M_w/M_n$ by GPC | 5.16 | 3.79 | 3.14 |

In each of Examples 1 through 8, polypropylene homopolymer was used as the polyolefin.

In the following examples, the product of Example 1 will be referred to as Prodex 1, the product of Example 2 will be referred to as Prodex 2, and so on.

TABLE 2

Initial Trials

| | Example | | | |
|---|---|---|---|---|
| | 9 Comparative | 10 Comparative | 11 Comparative | 12 |
| Wood Flour | 40 | 40 | 40 | 40 |
| Phenol/Phosphite Anti-Oxidant | 0.25 | 0.25 | 0.25 | 0.25 |
| Prodex 1 | | 2.5 | | |
| Prodex 2 | | | 2.5 | |
| Prodex 3 | | | | 2.5 |
| Polypropylene (4 MFR) | 59.75 | 57.25 | 57.25 | 57.25 |
| Tensile Strength, MPa | 27.1 | 32.3 | 33.4 | 36.3 |
| Change vs. Example 9 (%) | 0 | 19 | 23 | 34 |
| Flexural Strength, MPa | 45.7 | 53.6 | 51.4 | 58.5 |
| Change vs. Example 9 (%) | 0 | 17 | 12 | 28 |
| Reversed Notch Izod Impact, J/m | 55.5 | 70.5 | 60.9 | 77.4 |
| Change vs. Example 9 (%) | 0 | 27 | 10 | 39 |
| Unnotched Charpy Impact, J/m | 146 | 139 | 140 | 165 |
| Change vs. Example 9 (%) | 0 | −5 | −4 | 13 |
| Water Absorption (% Wt. increase after 30 days immersion) | 7.9 | 5.0 | 6.1 | 2.7 |

Example 12 containing the coupling agent of the present invention gave higher tensile, flexural, and impact strengths, and lower water absorption than Comparative Examples 10 and 11 containing the coupling agents of Examples 1 and 2.

TABLE 3

Comparison of Prodex 1 vs. Prodex 4 and Prodex 5 in 50% Wood-Filled Polypropylene

| | Example | | | |
|---|---|---|---|---|
| | 13 Comparative | 14 Comparative | 15 | 16 |
| Wood Flour | 50 | 50 | 50 | 50 |
| Phenol/Phosphite Anti-Oxidant | 0.125 | 0.125 | 0.125 | 0.125 |
| Prodex 1 | | 2 | | |
| Prodex 4 | | | 2 | |
| Prodex 5 | | | | 2 |
| Polypropylene (4 MFR) | 49.9 | 47.9 | 47.9 | 47.9 |
| Tensile Strength, MPa | 29.4 | 37.1 | 52.2 | 52.6 |
| Change vs. Example 13 (%) | 0 | 26 | 78 | 79 |
| Flexural Strength, MPa | 47.2 | 57.4 | 81.1 | 82.6 |
| Change vs. Example 13 (%) | 0 | 22 | 72 | 75 |
| Reversed Notch Izod Impact, J/m | 65.7 | 63.0 | 106 | 108 |
| Change vs. Example 13 (%) | 0 | −4 | 61 | 65 |
| Unnotched Charpy Impact, J/m | 138 | 162 | 248 | 249 |
| Change vs. Example 13 (%) | 0 | 18 | 80 | 81 |
| Water Absorption (% Wt. increase after 30 days immersion) | 8.2 | 6.6 | 4.3 | 4.2 |

Examples 15 and 16 containing the coupling agents of the present invention had significantly higher strength properties and lower water absorption compared with Comparative Example 14, containing the coupling agent of Example 1.

TABLE 4

Comparison of Prodex 1 vs. Prodex 4 in 60% Wood-Filled Polypropylene Containing a Lubricant

| | Example | | | |
|---|---|---|---|---|
| | 17 Comparative | 18 Comparative | 19 Comparative | 20 |
| Wood Flour | 60 | 60 | 60 | 60 |
| Phenol/Phosphite Anti-Oxidant | 0.1 | 0.1 | 0.1 | 0.1 |

TABLE 4-continued

Comparison of Prodex 1 vs. Prodex 4
in 60% Wood-Filled Polypropylene Containing a Lubricant

| | Example | | | |
|---|---|---|---|---|
| | 17 Comparative | 18 Comparative | 19 Comparative | 20 |
| Prodex 1 | | 2 | 2 | |
| Prodex 4 | | | | 2 |
| Lubricant - Fatty Acid Ester | | | 3 | 3 |
| Polypropylene (4 MFR) | 39.9 | 37.9 | 34.9 | 34.9 |
| Tensile Strength, MPa | 25.3 | 33.4 | 30.1 | 44.4 |
| Change vs. Example 17 (%) | 0 | 32 | 19 | 75 |
| Flexural Strength, MPa | 40.9 | 51.8 | 45.7 | 73.4 |
| Change vs. Example 17 (%) | 0 | 27 | 12 | 79 |
| Reversed Notch Izod Impact, J/m | 49.7 | 60.9 | 52.9 | 91.3 |
| Change vs. Example 17 (%) | 0 | 23 | 6 | 84 |
| Unnotched Charpy Impact, J/m | 90 | 106 | 90 | 186 |
| Change vs. Example 17 (%) | 0 | 17 | 0 | 107 |
| Water Absorption (% Wt. increase after 30 days immersion) | 1.2 | 8.2 | 6.1 | 3.2 |

Lubricants are known to negate the positive effects that maleated coupling agents have on strength properties. These Examples show that even when a lubricant is used, coupling agent Prodex 4 in Example 20 provides superior properties to Prodex 1 in Comparative Example 18 without lubricant and Comparative Example 19 with lubricant.

TABLE 5

Effect of Lubricants

| | Example | | | | | | | |
|---|---|---|---|---|---|---|---|---|
| | 21 Comp. | 22 Comp. | 23 Comp. | 24 Comp. | 25 | 26 | 27 | 28 |
| Wood Flour | 50 | 50 | 50 | 50 | 50 | 50 | 50 | 50 |
| Phenol/Phosphite Antioxidant | 0.125 | 0.125 | 0.125 | 0.125 | 0.125 | 0.125 | 0.125 | 0.125 |
| Prodex 1 | | 2 | 2 | 2 | | | | |
| Prodex 4 | | | | | 2 | 2 | 2 | 2 |
| Lubricant - Fatty Acid Ester | | | 3 | 0.75 | | 3 | 0.75 | |
| Lubricant - Fatty Acid Amide | | | | 2.25 | | | 2.25 | 3 |
| Polypropylene (4 MFR) | 49.875 | 47.875 | 44.875 | 44.875 | 47.875 | 44.875 | 44.875 | 44.875 |
| Tensile Strength, MPa | 29.3 | 37.6 | 33.3 | 31.0 | 44.9 | 45.3 | 44.8 | 42.6 |
| Change vs. Example 21 | 0% | 28% | 14% | 6% | 53% | 55% | 53% | 45% |
| Flexural Strength, MPa | 47.0 | 59.5 | 53.3 | 45.0 | 74.3 | 66.9 | 66.5 | 64.6 |
| Change vs. Example 21 | 0% | 26% | 13% | −4% | 58% | 42% | 41% | 37% |
| Reversed Notched Izod Impact, J/m | 59.3 | 70.0 | 70.0 | 65.1 | 123 | 74.8 | 100 | 100 |
| Change vs. Example 21 | 0% | 18% | 18% | 10% | 107% | 26% | 69% | 69% |
| Unnotched Charpy Impact, J/m | 134 | 139 | 138 | 113 | 231 | 179 | 210 | 178 |
| Change vs. Example 21 | 0% | 3% | 3% | −16% | 72% | 33% | 57% | 32% |
| Water Absorption (% Increase after 30 Days Immersion | 7.0 | 5.8 | 3.4 | 4.0 | 2.7 | 2.8 | 2.7 | 3.8 |

Comp. = Comparative
MA-PP = Maleic Anhydride-Polypropylene

Table 5 provides additional proof that the functionalized coupling agents of the present invention are less susceptible to interference from lubricants than are previously known coupling agents. Adding either a fatty acid ester or a blend of fatty acid esters and amides to formulations containing such previously known coupling agents resulted in a significant reduction in mechanical properties (see Comparative Examples 22-24). When a functionalized polyolefin coupling agent of the present invention was combined with the same two lubricants, reductions in mechanical properties were much smaller (see Examples 25-28).

TABLE 6

Evaluation of Lower Molecular Weight Samples

| | Example | | | | |
|---|---|---|---|---|---|
| | 29 Comp. | 30 Comp. | 31 | 32 | 33 |
| Wood Flour | 50 | 50 | 50 | 50 | 50 |
| Phenol/Phosphite Antioxidant | 0.125 | 0.125 | 0.125 | 0.125 | 0.125 |
| Prodex 1 | 2 | | | | |
| Prodex 6 | | 2 | | | |
| Prodex 7 | | | 2 | | |
| Prodex 8 | | | | 2 | 2 |
| Polypropylene (4 MFR) | 49.875 | 47.875 | 47.875 | 47.875 | 47.875 |
| Tensile Strength, MPa | 28.9 | 37.6 | 50.9 | 50.0 | 49.9 |
| Change vs. Example 29 | 0% | 30% | 76% | 73% | 73% |
| Flexural Strength, MPa | 47.2 | 59.1 | 79.6 | 80.0 | 79.4 |
| Change vs. Example 29 | 0% | 25% | 69% | 70% | 68% |
| Reversed Notched Izod Impact, J/m | 55.5 | 65.1 | 107 | 106 | 104 |
| Change vs. Example 29 | 0% | 17% | 93% | 90% | 88% |
| Unnotched Charpy Impact, J/m | 130 | 158 | 268 | 224 | 239 |
| Change vs. Example 29 | 0% | 21% | 107% | 73% | 84% |
| Water Absorption (% Increase after 30 Days Immersion | 6.4 | 4.4 | 2.5 | 3.1 | 3.4 |

It can readily be seen that functionalized polyolefin coupling agents of the present invention provide superior mechanical properties compared to previously known coupling agents with similar Melt Flow Rates.

In view of the many changes and modifications that can be made without departing from principles underlying the invention, reference should be made to the appended claims for an understanding of the scope of the protection to be afforded the invention.

What is claimed is:

1. A process for preparing a composite material, the process comprising mixing at least one natural fiber, at least one polypropylene resin, and a coupling agent to provide said composite material; wherein said coupling agent consists essentially of a base polypropylene homopolymer that is grafted with a total of more than about 1 mmole of at least one polar monomer per 100 grams of functionalized polypropylene homopolymer coupling agent, and wherein said functionalized polypropylene homopolymer coupling agent possesses a molecular weight distribution of greater than 2.5 ($M_w/M_n$ by GPC).

2. The process of claim 1 wherein the natural fiber is selected from the group consisting of wood flour, wood fiber, and agricultural fiber.

3. The process of claim 1 wherein the natural fiber is selected from the group consisting of wood flour, wood fiber, hemp, flax, and kenaf.

4. The process of claim 1 wherein the natural fiber is employed at a level in the range of from about 20 to about 85 weight % based on the total formulation weight of the composite material.

5. The process of claim 1 wherein the base polypropylene homopolymer is grafted with a total of more than about 5 mmole of at least one polar monomer per 100 grams of functionalized polypropylene homopolymer coupling agent.

6. The process of claim 1 wherein the base polypropylene homopolymer is grafted with a total of more than about 10 mmole of at least one polar monomer per 100 grams of functionalized polypropylene homopolymer coupling agent.

7. The process of claim 1 wherein the polypropylene resin is a polypropylene copolymer comprising a major proportion of propylene combined with a minor proportion of a second monomer selected from the group consisting of ethylene and $C_4$-$C_{16}$ monomer materials.

8. The process of claim 1 wherein the polypropylene resin is polypropylene homopolymer.

9. The process of claim 1 wherein the polar monomer is selected from the group consisting of ethylenically unsaturated carboxylic acids, ethylenically unsaturated carboxylic acid anhydrides, and derivatives of the foregoing.

10. The process of claim 9 wherein the polar monomer is selected from the group consisting of maleic acid, fumaric acid, itaconic acid, crotonic acid, acrylic acid, methacrylic acid, maleic anhydride, itaconic anhydride, substituted maleic anhydrides, and derivatives of the foregoing.

11. The process of claim 1 wherein the polar monomer is maleic anhydride.

12. A composite material prepared by a process comprising mixing at least one natural fiber, at least one polypropylene resin, and a coupling agent to provide said composite material; wherein said coupling agent consists essentially of a base polypropylene homopolymer that is grafted with a total of more than about 1 mmole of at least one polar monomer per 100 grams of functionalized polypropylene homopolymer coupling agent, and wherein said functionalized polypropylene homopolymer coupling agent possesses a molecular weight distribution of greater than 2.5 ($M_w/M_n$ by GPC).

13. A composite material comprising at least one natural fiber, at least one polypropylene resin, and a coupling agent; wherein said coupling agent consists essentially of a base polypropylene homopolymer that is grafted with a total of more than about 1 mmole of at least one polar monomer per 100 grams of functionalized polypropylene homopolymer coupling agent, and wherein said functionalized polypropylene homopolymer coupling agent possesses a molecular weight distribution of greater than 2.5 ($M_w/M_n$ by GPC).

* * * * *